Patented Jan. 2, 1951

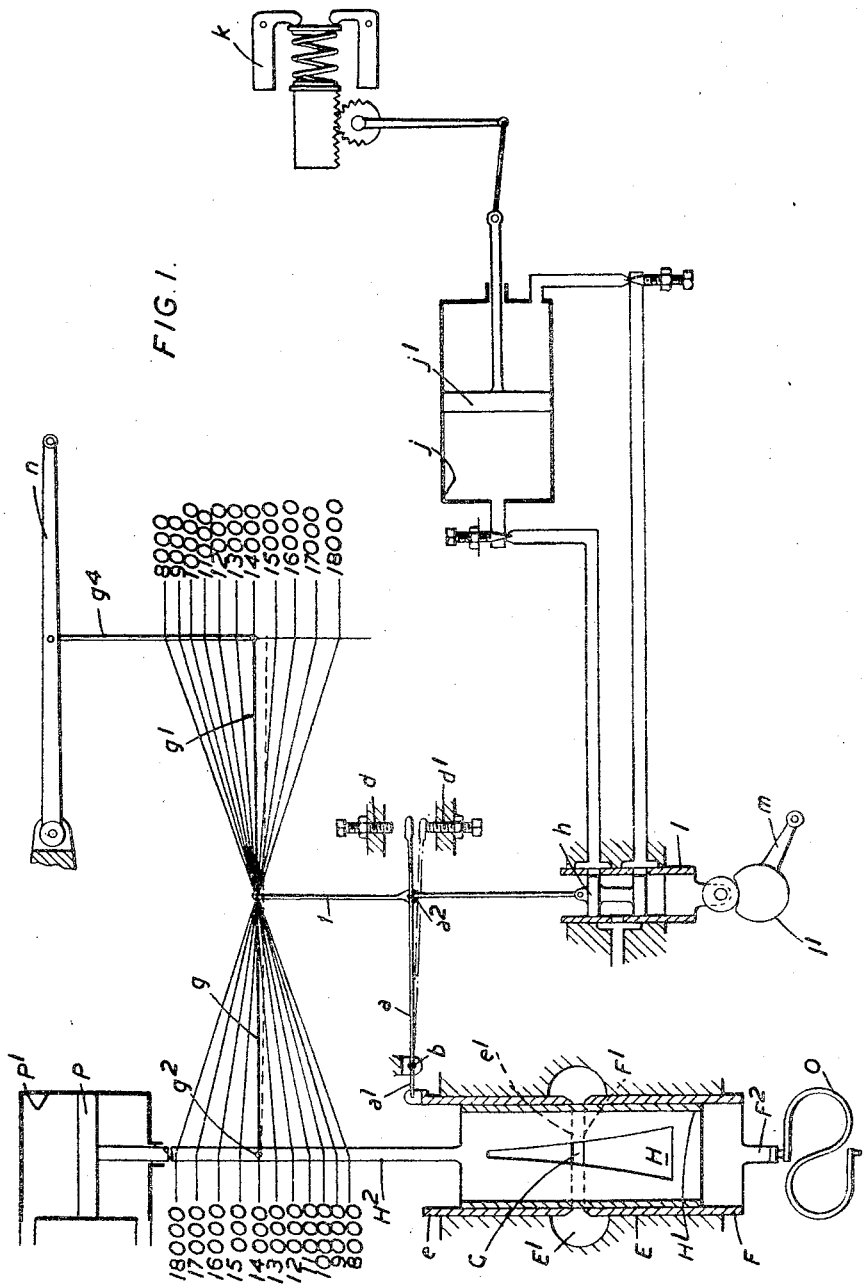

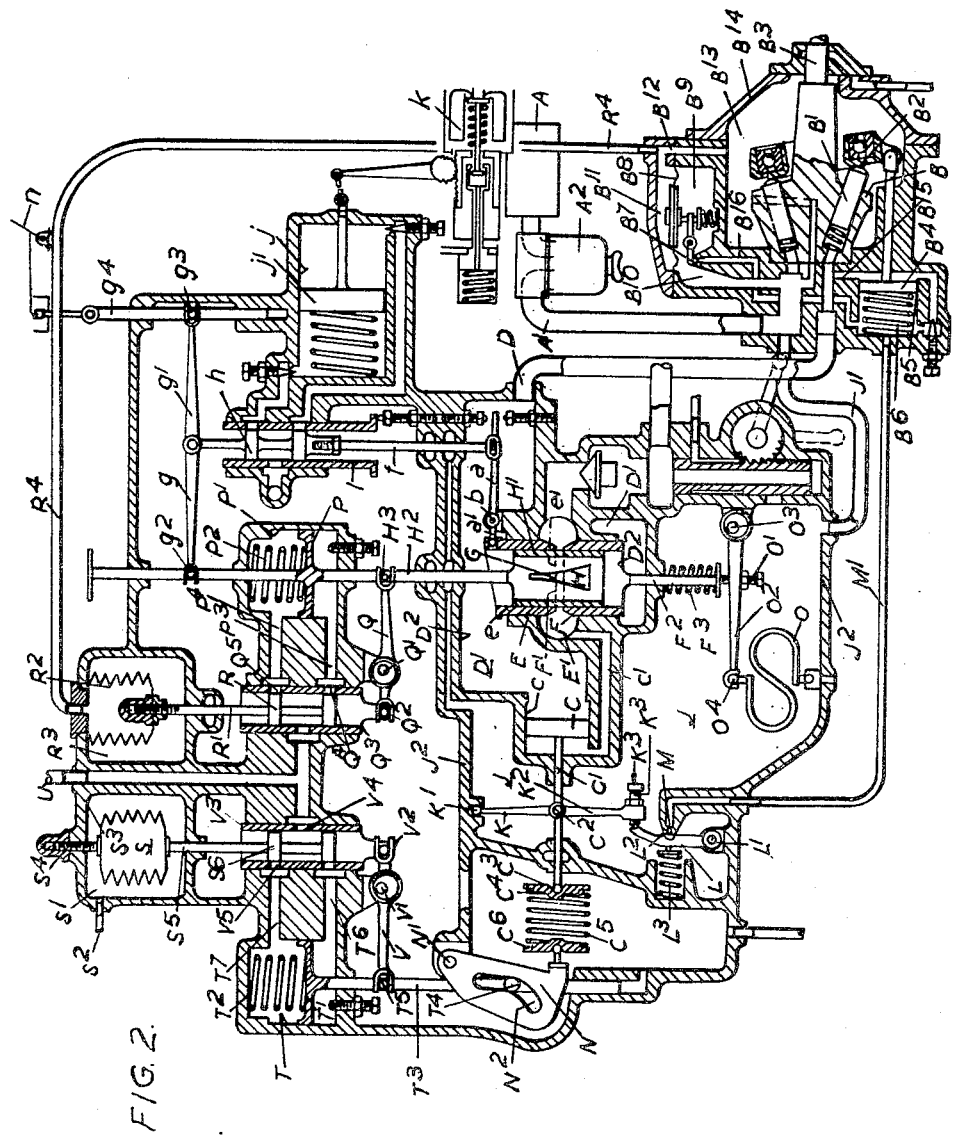

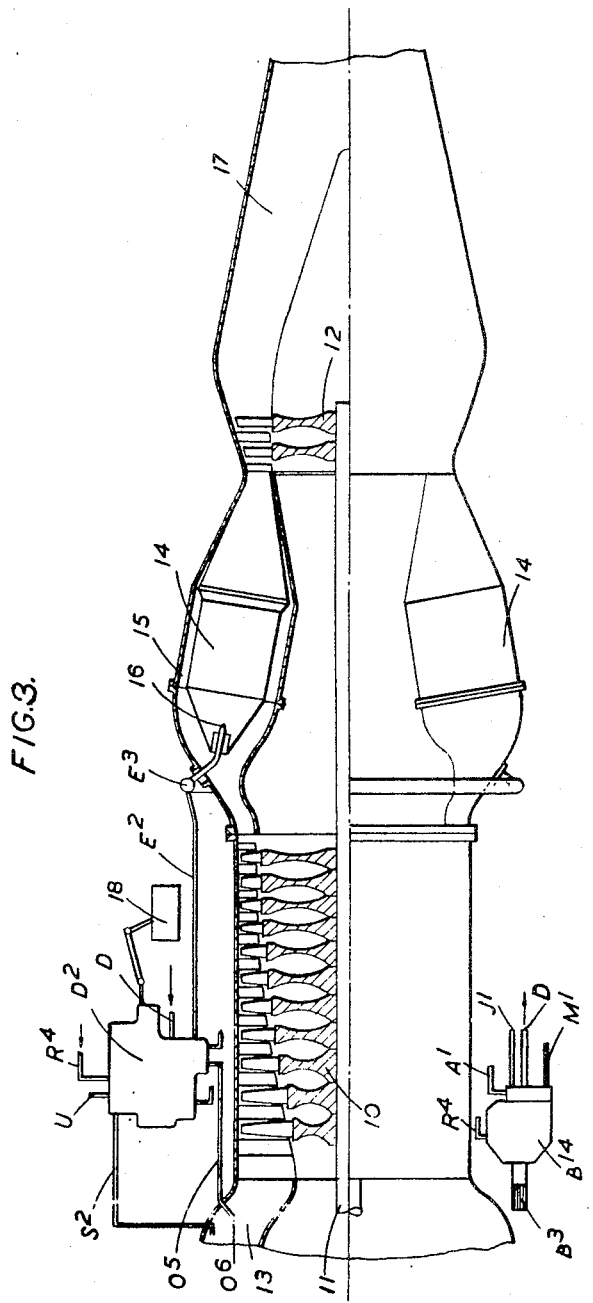

2,536,158

UNITED STATES PATENT OFFICE 2,536,158

APPARATUS FOR METERING THE FUEL SUPPLIED TO A PRIME MOVER

Reginald Henry Douglas Chamberlin and Charles Horace Lionel Wynne, London, and John Skellern, Northolt, England, assignors to D. Napier & Son Limited, London, England, a company of Great Britain Application August 5, 1947, Serial No. 766,260 In Great Britain July 1, 1946

Section 1, Public Law 690, August 8, 1946 Patent expires July 1, 1966

2 Claims. (Cl. 60—41)

This invention relates to appartus for metering the fuel supplied to a prime mover in a power unit of the type comprising a compressor which delivers air to one or more chambers in which fuel is burnt, the products of combustion from these chambers flowing to and acting on a turbine which drives the compressor and also a governor-controlled variable pitch airscrew, the power unit being designed for use in an aircraft.

The present invention concerns an improvement in and simplification of the stability control apparatus as described in the specification of the copending application for United States Letters Patent Serial No. 766,259, filed Aug. 5, 1947, that control being designed for use in fuel metering appartus as described in the specification of the copending application for United States Letters Patent Serial No. 758,440, filed July 1, 1947, now Patent No. 2,479,813. In that metering apparatus there is a metering orifice the dimensions of which in directions at right angles are determined by two relatively movable members. A variable delivery pump driven by and in speed relation to the prime mover and to which fuel is supplied under pressure, delivers this fuel to the metering orifice. The dimensions of the metering orifice are varied on the one hand by movement of one member in accordance with the temperature of the air passing through the compressor in the power unit, and on the other hand by the movement of another member by a servo motor controlled in accordance with the speed of the prime mover in association with the pressure at which the fuel is supplied to the pump. The volumetric delivery by the pump is dependent on the differential action of the pressures on the opposite sides of the metering orifice in association with the air pressure at the intake of the compressor in the power unit.

With the fuel metering apparatus described in the aforementioned copending patent application, Serial No. 758,440, instability may sometimes arise where the apparatus is used in conjunction with a variable pitch airscrew, unless measures are taken to prevent this. This is due to the fact that at a given pitch the power which the airscrew absorbs varies with changes of speed to a lesser extent than does the power output of the turbine with corresponding speed changes. Thus if, for instance, using a fuel metering apparatus as described in the copending patent application Serial No. 758,440, the speed of the prime mover is to be increased, the airscrew pitch must first be reduced in order to enable the turbine to accelerate. At the new speed, however, the airscrew pitch must be greater than it was originally in order that its power absorption shall correspond with the new power output of the turbine. Thus in order to effect a speed change the blades must first be rotated in the opposite direction to that in which they must ultimately be moved. The present invention, on the other hand, enables speed changes to be effected while moving the blades in only one direction.

The stability control apparatus as described in the specification of the copending patent application first mentioned above comprises in combination with the fuel metering apparatus referred to, a delayed action servo motor disposed in the control mechanism between the metering unit and the airscrew governor and operative on that governor, a third member which controls the dimensions of the metering orifice and is additional to and movable relatively to the two main members whose movements vary the area of that orifice, and means whereby this third member is moved or set in accordance with the speed of the prime mover as selected by the control and in accordance with its actual speed. The area of the metering orifice is mainly determined by the relative movements of two concentric sleeves of which in the inner one there is at least one port, while the third member controlling the size of this orifice is also a sleeve and this is movable either by rotation or by sliding in the axial direction on the inner and ported sleeve, being coaxial with and movable relatively to the outer or second sleeve which is also movable on the ported sleeve.

According to this invention movement is imparted to the third sleeve member controlling the area of the metering orifice through a linkage which connects it to a point intermediate in the length of a floating lever, this lever conveniently at this point being also connected to the valve controlling a servo motor which is operative to vary the action of the airscrew governor and thus effect adjustment of the blades of the airscrew, one end of the floating lever being connected to and movable by a servo motor which is operative in accordance with the actual speed of the prime mover to move the inner ported sleeve controlling the area of the metering orifice, while the other end of the floating lever is movable through the pilots control lever. It is convenient to provide a manual over-ride device with respect to the valve of the servo motor controlling the action of the airscrew governor, this over-ride acting on a ported sleeve within which moves the piston valve of the servo motor. In this arrangement it is preferable, though not necessary, for the movement of the third sleeve member controlling the area of the metering orifice to be a sliding one in the direction of its axis rather than a rotary one about that axis.

By means of this control mechanism the actual R. P. M. will be brought into exact agreement with the R. P. M. as selected by the setting of the control lever and the mechanism will be insensitive to the effects of airscrew governor errors. At the same time the servo motor which is operative on the airscrew governor functions with delayed action as in the stability control apparatus referred to above. It is to be noted that with this improvement there is rendered unnecessary the cam associated with the pilots control and operative on the one end of the floating lever. In the fuel metering apparatus the errors due to governor tolerance may be eliminated by means of the present improvement.

The constructional details of the apparatus may vary but the accompanying drawings illustrate by way of example how the invention may be carried out in practice. In these drawings, Figure 1 shows diagrammatically the improved stabilising fuel control apparatus in association with the movable members which together constitute the metering orifice, Figure 2 shows diagrammatically the fuel metering apparatus as described in the specification of the copending application Serial No. 758,440 but with the improved stabilising control according to the present invention combined therewith.

Figure 3 is a diagrammatic representation of an internal combustion prime mover of the type with which the invention is more especially intended for use and showing the manner in which the present fuel metering apparatus may be associated therewith.

It will be convenient in the first place to describe the chief features of the metering apparatus as a whole and as shown diagrammatically in Figure 2.

The fuel is contained in a tank A from which it is delivered under pressure through a pipe $A^1$ to a fuel pump B, the fuel on its way preferably passing through a filter $A^2$. The pump B is of the variable stroke and delivery type, and conveniently of a known construction as here shown. In this construction the variation of the strokes of the plungers $B^1$ is effected by altering the angular position of a swash plate $B^2$ in relation to the axis about which the pump rotates. The pump shaft $B^3$ is driven by suitable means either directly or indirectly from a rotating part of the prime mover which, as mentioned above, and for example, may be of a known type which includes a turbine driven by the products of combustion from one or more chambers wherein fuel is burnt in air which is delivered thereto by a compressor driven by the turbine. The variation in the stroke of the pump B is effected by a servomotor comprising a piston $B^4$ movable in a cylinder $B^5$ against the action of a spring $B^6$. This servomotor is controlled on the one hand by means dependent on movement derived from a piston C subject in the cylinder c to the differential action of the fluid pressures on the opposite sides of the metering orifice. An abutment for the piston C is adjustable in a manner to be described in dependence on the ram air pressure, that is the pressure at the entry to the compressor of the prime mover. Operation of the servomotor $B^4$, $B^5$ is also controlled by an overspeed control valve $B^7$ actuated in a known manner by the difference in pressures on the opposite sides of a diaphragm $B^8$. The diaphragm is situated in a chamber of which one part $B^9$ on one side of the diaphragm is in communication through a passage $B^{10}$ with the pipe $A^1$ through which the fuel is supplied from the tank A. The other part $B^{11}$ of the chamber enclosing the diaphragm $B^8$ is in communication through a passage $B^{12}$ with a chamber $B^{13}$ within a casing $B^{14}$ which encloses the pump B. Fluid contained in this chamber $B^{13}$ will act on the side of the diaphragm $B^8$ in the chamber $B^{11}$ with a pressure due to centrifugal action of the pump B this pressure being thus determined by the speed at which the pump is rotated, and it is thus in definite relation to the speed of rotation of the prime mover which drives the pump. The overspeed control valve $B^7$ is therefore actuated by the difference between the pressure at which the fuel is delivered to the pump B and a pressure which has a direct relation to the speed of the pump and the prime mover.

The pressures acting on the piston $B^4$ of the servomotor which effects the variation in the stroke of the pump B are on the one hand the pressure at which the fuel is delivered by the pump B through the pipe D which is in communication with one end of the cylinder $B^5$ through a passage $B^{15}$. On the other hand there is acting on the other face of the piston $B^4$ in addition to the spring $B^6$ operating fluid pressure transmitted through a pipe $M^1$. A passageway $B^{16}$ leading from this end of the cylinder $B^5$ terminates in an orifice controlled by the overspeed control valve $B^7$ which thus permits a leak off of the operative fluid pressure in the pipe $M^1$. There is a similar leak off of this pressure controlled in a manner to be described hereunder by the piston C.

The metering orifice seen on an enlarged scale in Figure 1 but also illustrated in Figure 2 is preferably constructed and arranged in the following way. The fuel is delivered by the pump B through the pipe D into a chamber $D^1$ within a closed casing $D^2$. In this chamber there is mounted a cylinder E which is open at both ends so that the fuel in the chamber $D^1$ can freely enter the cylinder. About the centre of the length of the cylinder E there is a circumferentially extending port or opening in the wall of the cylinder constituting an annular chamber $E^1$ into which the fuel enters after it is passed through the metering orifice.

In what may be referred to for convenience as the upper end portion of the cylinder E there is a sliding sleeve e having an edge $e^1$ which lies in a plane normal to the axis of the cylinder E and in a position where it extends across the opening into the annular chamber $E^1$. This sliding sleeve e is the third sleeve member referred to above as a feature of the present invention. In the opposite or lower end portion of the cylinder E is a sleeve F which can slide in the cylinder, the upper and inner edge $F^1$ of this sleeve being so positioned that as the sleeve slides this edge will be moved across the opening into the chamber $E^1$. By sliding either or both of the sleeves e, F the gap G between the edges $e^1$ $F^1$ of the sliding sleeves which are both straight and lie in planes normal to the axis of the cylinder can be varied in width thereby altering the dimension of the metering orifice G in the direction of the cylinder axis. This gap between the opposed edges $e^1$ $F^1$ of the sliding sleeves e and F extends circumferentially through 360° but only a part of it is effectively open or uncovered for the flow of fuel by a port H in the wall of an inner sliding sleeve $H^1$. The fuel delivered by the pump into the chamber $D^1$ and thus into the interior of the sleeve $H^1$ will flow through the metering orifice G into the annular chamber $E^1$, the dimensions of the orifice G being variable by the relative positioning of the sleeves $e$ F and $H^1$. The outer sleeves $e$ F have the same thickness so that the inner surfaces of these two sleeves, together constitute a cylinder of uniform internal diameter in whose wall is a gap the width of which in the axial direction can be varied according to the positions into which the sleeves $e$ and F are moved. In the cylinder thus formed by the sliding sleeves $e$ F lies and can slide the inner sleeve $H^1$, and the port H in the wall of this sleeve is V-shaped as shown, the apex of this port extending in the direction of the axis of the sleeve, and, for example and as shown in the drawings, in what may be referred to as the upward direction. As it is shown for example in Figure 1 this port H has a shape which resembles an isosceles triangle with a short base and sides which are not straight but similarly and slightly curved inwards towards each other. When this sleeve $H^1$ is in its initial position of rest the centre part in the length of the port lies across the above-mentioned circumferential gap which surrounds the sleeve $H^1$ and is formed between the edge $e^1$ of the sleeve $e$ and the edge $F^1$ of the sleeve F. Where the port H and this gap coincide there is formed the metering orifice of passage G whose dimension in the circumferential direction will be varied by sliding the sleeve $H^1$. On the other hand as already mentioned the dimension of this metering orifice G in the axial direction can be varied by sliding either or both of the outer sleeves $e$ and F so as to alter the width of the gap through which the metered fuel is delivered into the annular chamber $E^1$.

In a part of the chamber $D^1$ within the casing $D^2$ which contains the above mentioned parts constituting the variable metering orifice G is the cylinder $c$ in which is the piston C which has been already referred to. This piston and cylinder may be replaced by a pressure sensitive capsule which will function in the same way. For convenience this device may be designated the metering pressure device the piston or capsule being subject on the one hand to the pressure of the fuel as delivered by the pump B that is the pressure in the chamber $D^1$ into which as described this fuel is delivered through the pipe D. On the other hand the other end of the cylinder $c$ is filled with fuel which has passed through the metering orifice G, this end of the cylinder being in communication through a passage $c^1$ with the annular chamber $E^1$. Thus at this side the piston C is subjected to the pressure of the fuel after it has passed through the metering orifice G, this being the pressure at which fuel is delivered to the burners.

From the piston C runs a rod $C^1$ which can slide through an opening in the end of the cylinder $c$. A part intermediate in the length of the rod $C^1$ lies in and passes across a closed chamber J which conveniently contains fuel at the pressure at which it left the supply tank A and goes to the pump B. This fuel enters the chamber J through a passage $J^1$ which communicates with the fuel supply pipe $A^1$. A lever extends transversely across this intermediate part in the length of the rod $C^1$ to which the lever is pivotally connected at $C^2$. The end of one arm K of this lever is fulcrumed at $K^1$ in a suitable place in the wall $J^2$ of the chamber J. The other arm $K^2$ of this lever carries at its end an adjustable stud $K^3$ which makes contact with a lever L pivoted at $L^1$ and carrying a valve $L^2$ controlling the opening M at the end of piping $M^1$ leading from the servomotor cylinder $B^5$. When this valve $L^2$ is lifted it allows a leak-off into the chamber J of the fluid pressure acting in the manner described above on one side of the piston $B^4$ of the servomotor which varies the stroke of the fuel pump B. A spring $L^3$ tends to move the lever L in a direction which will keep the valve $L^2$ on its seat in the opening M.

At its outer end $C^3$ the piston rod $C^1$ bears through a cap $C^4$ on one end of a coiled spring $C^5$ whose other end through a cap $C^6$ bears on a cam lever member N pivoted at $N^1$. In this lever member N is a cam slot $N^2$ and movement of this lever, which is effected in a manner to be described, varies the pressure exerted by the spring $C^5$ on the piston C.

In association with the stability device forming the subject of the present invention the movements necessary to alter the dimensions of the metering orifice G are effected on the one hand by variations in the temperature of the air at the intake to the compressor of the power unit, and on the other hand by the speed of the motor in this unit in association with the pressure of the fuel as delivered from the tank A to the fuel pump B. Movement is imparted to the outer sleeve F by a Bourdon tube O which is connected in a known manner to a thermometer, such as a mercury in steel thermometer, situated in the air intake to the compressor (see Fig. 3). A rod $F^2$ runs, for example downwards, from the sleeve F through the wall $D^2$ enclosing the chamber $D^1$ into the chamber J which as mentioned contains fuel at the pressure at which it flows from the tank A to the pump B. The outer end of this rod $F^2$ is acted on by a spring $F^3$ which tends to move the sleeve F downwards, that is in a direction which will increase the width of the gap between the edge $F^1$ of the sleeve F and the edge $e^1$ of the sleeve $e$, this movement thus increasing the dimension of the metering orifice G in the direction of the sleeve axis. The end of the rod $F^2$ bears on an adjustable stud $O^1$ on a lever $O^2$ fulcrumed at $O^3$ in an eccentric bearing which permits adjustment. The free end $O^4$ of the lever $O^2$ is connected to one end of the Bourdon tube O, the other end of this tube being carried by the wall $J^2$ of the chamber J and suitably connected to the thermometer.

From the upper end of the inner sleeve $H^1$ a rod $H^2$ passes through the wall $D^2$ of the chamber $D^1$ and is connected to the piston P of a servomotor. This piston P can move in a cylinder $P^1$ and is acted on by a spring $P^2$ which through the piston P tends to move the sleeve $H^1$ in a direction which, owing to the shape and disposition of the port H, will reduce the size of the metering orifice G. At a point $H^3$ in its length this rod $H^2$ is connected to the end of one arm Q of a lever which is pivoted at $Q^1$ in an eccentric bearing which permits of adjustment. The other arm $Q^2$ of this lever is connected to a ported sleeve $Q^3$ within which lies and can move a piston valve R. The sleeve $Q^3$ and the valve R together control the flow of pressure fluid to and from the ends of the cylinder $P^1$ of the servomotor, this flow taking place through passages $P^3$ and $P^4$. Movement of the sleeve $Q^3$ varies the positions of ports $Q^4$ and $Q^5$ in this sleeve in relation to the ends of the passages $P^3$ $P^4$, thus varying the control of the flow through these passages as effected by the piston R. The piston R is connected through a rod $R^1$ to a pressure sensitive capsule $R^2$ disposed in a chamber $R^3$ which is in communication with the passage $J^1$, this which as already mentioned is in communication with the fuel supply pipe $A^1$ so that the chamber $R^3$ contains fuel at the pressure at which it is delivered from the tank A to the pump B. At the end opposite to that which is connected to the rod $R^1$ the capsule $R^2$ abuts against the wall of the chamber $R^3$ and the interior of the capsule is connected through piping $R^4$ and passage $B^{12}$ with the chamber $B^{13}$ in which rotates the fuel pump B. The interior of the capsule $R^2$ is thus subjected to pressure due to the centrifugal force set up by the liquid in the chamber $B^{13}$ and this is a pressure which varies according to the speed of rotation of the pump B which is related to the speed of rotation of the prime mover.

An exhausted pressure sensitive capsule S is disposed in a chamber $S^1$ which is subjected through piping $S^2$ to the air pressure, commonly referred to as the ram pressure, at the intake to the compressor in the power unit. Where this unit is installed in an aircraft this ram pressure at the intake will be much above the normal atmospheric pressure so long as the aircraft is in flight. At one end this capsule S bears against an abutment constituted by the wall $S^3$ of the casing enclosing the chamber $S^1$ and while this abutment is in effect fixed it is as shown adjustable by the screw $S^4$ for primary setting purposes. At its other end the capsule S is connected through a rod $S^5$ to a piston valve $S^6$ which controls the flow of pressure fluid to the cylinder T of a servomotor. This pressure fluid is supplied through a pipe U from a suitable source both to the servomotor T and to the servomotor P $P^1$. The piston $T^1$ in the cylinder T has a spring $T^2$ acting on one side of it and from the opposite side runs a rod $T^3$ which is suitably guided where it passes through the end of the cylinder T and at its outer end in the wall of the casing of the apparatus. At a convenient point in the length of the piston rod $T^3$ is a pin or roller $T^4$ which engages the cam slot $N^2$ in the lever N. At another point $T^5$ in the length of the piston rod $T^3$ it is connected to one arm V of a lever pivoted at $V^1$ in an eccentric bearing, the other arm $V^2$ of this lever being connected to a ported sliding sleeve $V^3$ within which moves the piston valve $S^6$. Movement of the sleeve $V^3$ will set the ports $V^4$ $V^5$ therein in relation to the piston valve $S^6$ and the passages $T^6$ $T^7$ through which the pressure liquid flows from the piping U to the opposite ends of the servo cylinder T. Movement of the piston $T^1$ of this servomotor will thus not only adjust the position of the sleeve $V^3$ but also through the cam lever N vary the strength of the spring $C^5$ which constitutes an abutment for the metering pressure piston C. In this way the spring $C^5$ will be automatically adjusted in accordance with the air pressure at the intake to the compressor in the power unit.

According to the present invention movement is imparted to the third sleeve e and this movement is controlled in the following way. A two-armed lever $a$ $a^1$ fulcrumed at b has the end of one arm $a^1$ connected to the sleeve e while the end of the other arm $a$ moves between adjustable studs $d$ $d^1$. At a point $a^2$ on the arm $a$ of this lever it is connected by a link $f$ to a point in the length of a floating lever $g$ $g^1$ and also to a piston valve $h$ which controls the flow of pressure liquid to the cylinder $j$ of a servomotor whose piston $j^1$ controls the air-screw governor $k$. The valve $h$ moves in a ported sleeve $l$ which itself is movable in the direction of its axis by the action of a cam $l^1$ rotatable by a manually actuated lever $m$. The arm $g$ of the floating lever is connected at $g^2$ to the rod of the piston P of the servomotor which imparts movement to the inner ported sleeve $H^1$ controlling the dimensions of the metering orifice. This servomotor as mentioned is operative to control the area of the metering orifice G in accordance with the speed of the prime mover. The free end of the other arm $g^1$ of the floating lever is connected at $g^3$ in some convenient way such as a link $g^4$ or other suitable connection to the pilot's control lever $n$.

The manner in which the improved apparatus functions may be explained by reference to specific examples.

Assume that the prime mover mounted in an aircraft is running at, say, 14,000 R. P. M. at sea level under stable conditions. The valve $h$ of the servomotor $j$ $j^1$ controlling the air-screw governor $k$ is then in its balanced or non-flow position and the piston $j^1$ of this servomotor will be in an intermediate position in the cylinder $j$ and will have selected and set the governor control spindle for the 14,000 R. P. M. at which the prime mover is actually running. If the pilot's manual control $n$ is now moved rapidly into the position to select, say, 14,500 R. P. M. this will move, say downwards, the arm $g^1$ of the floating lever which will then turn about its end $g^2$ where it is connected to the piston P of the speed servomotor. As a result of this anticipatory fuelling will take place since this movement of the floating lever will have moved the third sleeve member $e$ in a direction to increase the area of the metering orifice G. At the same time the movement of the floating lever $g$ $g^1$ will have moved the valve $h$ of the servomotor $j$ $j^1$ controlling the air-screw governor $k$ and by admitting pressure fluid to the cylinder $j$ it will cause adjustment of the governor in a manner which will lead to the selection of an increase in speed at a slower rate than the actual R. P. M. due to the increase in fuel flow. The rate of delay is determined by constrictions in the passages through which the pressure fluid flows into or out of the servomotor cylinder $j$. When the actual speed of the motor equals the speed which has been selected by the manual setting of the lever $n$, the fuelling will be correct for 14,500 R. P. M. and the valve $h$ of the servomotor $j$ $j^1$ will be set back to the mid or non-flow position. The R. P. M. selected at the governor will however be slightly below 14,500. A slight fall in actual R. P. M. then occurs with an effect through the speed control servomotor P $P^1$ which then moves the end $g^2$ of the arm $g$ of the floating lever which is connected to that motor. This will again move the valve $h$ of the governor servomotor $j$ $j^1$ and the piston $j^1$ will assume a position that sets the governor control spindle for the 14,500 R. P. M. which has been selected by the setting of the pilot's control. As this condition is being attained the floating lever $g$ $g^1$ will move the valve $h$ again into the non-flow position.

Assume again that the aircraft in which is the prime mover is in level flight with the prime mover running under stable conditions at 14,000 R. P. M. The valve $h$ of the governor servomotor $j$ $j^1$ will be in its non-flow position and the piston $j^1$ will be in or about its mid position in the cylinder $j$. If now the aircraft enters a dive which may be supposed to increase the speed of the prime mover to 14,500 R. P. M., this will cause a movement of the piston P of the speed servomotor which will move the ported sleeve $H^1$ in one direction and through the floating lever $g$ $g^1$ and the lever $a$ $a^1$ a movement will be given to the outer sleeve $e$ in the opposite direction, with the net result that the fuel flow through the metering orifice G will be decreased or its increase restrained. The movement of the floating lever $g$ $g^1$ will impart movement to the valve $h$ of the governor servomotor $j$ $j^1$ so as to admit pressure fluid to that servomotor in such a manner as will cause it to act on the governor in a sense which will increase the rate of pitch-coarsening of the blades of the propeller over the normal action of the governor in response to the increase in R. P. M. Under the combined action of the governor $k$ and the decrease in the fuel supply the R. P. M. will be restored to 14,000. The governor servomotor $j$ $j^1$ will now be selecting slightly under 14,000 and the actual R. P. M. will corresponding fall somewhat, with the result that through the floating lever $g$ $g^1$ the valve $h$ will be put out of balance and into a position which will permit the flow of pressure fluid to the servomotor $j$ $j^1$ in a manner which will bring its piston $j$ $j^1$ into its mid position where it will be stabilised at the selected R. P. M. according to the conditions existing before the aircraft entered its dive.

It may be noted that the piston $j^1$ of the servomotor controlling the governor $k$ always creeps until it selects at the governor control spindle exactly the R. P. M. which has been selected by manual operation of the lever $n$. Hence the effect of governor characteristic tolerance is solely to alter the travel of the piston $j^1$ for a given manual selected speed difference. Thus governor tolerance has no adverse effect on either the metering system or the stability control functions.

As mentioned Figure 3 shows by way of example and diagrammatically an internal combustion turbine prime mover of a type with which the present invention is more especially but not exclusively intended to be employed. The prime mover here shown comprises an axial flow compressor 10 on a shaft 11 driven by a turbine 12. Air is drawn into the compressor through an intake 13 and is delivered into a number of separate combustion chambers 14 spaced equally apart around the shaft 11. Each combustion chamber 14 has an air jacket 15 and the air from the compressor 10 flows into the combustion chamber 14 through a burner 16 while some of this air flows through the jacket 15. Hot gases from the combustion chambers 14 act on the blades of the turbine 12 and then flow away through a passage 17 whence they may issue in the form of a propulsive jet. An airscrew, not shown in the drawing, is driven by the turbine from the shaft 11.

The casing $D^2$ enclosing all the parts of the metering apparatus as shown in Figure 2 is disposed in a position as indicated in Figure 3 at one side of the casing enclosing the compressor 10. In a convenient position opposite to the casing $D^2$ and as shown in Figure 3 there is placed the casing $B^{14}$ enclosing the fuel pump whose shaft $B^3$ is driven through gearing not shown from the turbine shaft 11.

The several pipes and connections between the metering apparatus in the casing $D^2$ and the fuel pump in the casing $B^{14}$ are indicated in Figure 3 by the same letters of reference as those parts are indicated in Figure 2. Thus the piping $S^2$ leads from the air intake 13 so as to transmit the ram pressure at the air intake to the chamber $S^1$ enclosing the capsule S. There is a connection $O^5$ between a thermometer $O^6$ in the air intake 13 and the thermometer tube O which transmits movement to the lever $O^2$ and through it to the sleeve F. The pipe U communicates with the supply of liquid under pressure which acts on the servo pistons P and $T^1$. The piping $R^4$ is the communication between the pump and the speed capsule $R^2$. The piping $J^1$ is the return to the fuel pump while the piping D is that through which fuel is delivered by the pump to the metering unit in the casing $D^2$. The piping $E^2$ leads the metered fuel from the annular chamber $E^1$ to a manifold $E^3$ which communicates with the burners 16 in the combustion chambers 14. The pipe $M^1$ leads to the servomotor cylinder containing the piston $B^4$ whose movement varies the stroke of the fuel pump. The air-screw governor is represented at 18 with its connection to the piston $j^1$ in the servomotor cylinder $j$ which is disposed within the casing $D^2$ for example as indicated in Figure 2.

What we claim as our invention and desire to secure by Letters Patent is:

1. Apparatus for metering the fuel supplied to a prime mover of the type indicated having a compressor and an airscrew governor, comprising in combination a metering orifice the dimensions of which in two directions at right angles to each other are determined by parts of three members relatively movable within a cylinder, namely at least one port in an inner sliding sleeve, the edge of a second and outer sliding sleeve which passes across said port in the inner sleeve, and the edge of a third and outer sleeve which lies across the port in the said inner sleeve, the said edges of the second and third sleeves being opposite and these sleeves being coaxial and together providing a cylindrical surface within which the said inner sleeve can move, a pump operative to deliver fuel in variable quantity to the said metering orifice, means for moving the said first and inner sleeve in relation to the metering orifice on the one hand in accordance with the speed at which the said fuel pump is driven and on the other hand in accordance with the pressure of the fuel as supplied to the said fuel pump, means for moving the second of the said sleeve members in relation to the metering orifice in accordance with the temperature of the air at the entry to the compressor of the prime mover, a delayed action servo motor operative on the airscrew governor, a floating lever connected at one point to the said inner and ported sleeve member, a connection at another point between this floating lever and the said third and outer sleeve member, a valve controlling the said servo motor which is operative on the airscrew governor, a connection between this valve and the said floating lever, a control lever adapted for manual operation, and a connection between this control lever and the said floating lever.

2. Apparatus for metering the fuel supplied to a prime mover of the type indicated having a compressor and an airscrew governor and comprising the parts set forth in claim 1, in which there is a servo motor connected to and actuating the said first and inner ported sleeve member, a connection between one end of the said floating lever and the said connection between said servo motor and said ported sleeve member, a connection between a point intermediate in the length of the said floating lever and the said third and outer sleeve member, and also a connection from that point to the said valve of the said delayed action servo motor operative on the airscrew governor, and a connection between the other end of the said floating lever and the said control lever.

REGINALD HENRY DOUGLAS CHAMBERLIN.
CHARLES HORACE LIONEL WYNNE.
JOHN SKELLERN.

REFERENCES CITED

The following references are of record in the file of this patent:

UNITED STATES PATENTS

| Number | Name | Date |
|---|---|---|
| 2,089,873 | Benson | Aug. 10, 1937 |
| 2,245,562 | Berker | June 17, 1941 |
| 2,398,586 | Maddox | Apr. 16, 1946 |
| 2,419,171 | Simpson | Apr. 15, 1947 |
| 2,457,595 | Orr | Dec. 28, 1948 |

FOREIGN PATENTS

| Number | Country | Date |
|---|---|---|
| 525,878 | Germany | June 4, 1931 |